United States Patent [19]

Lavo et al.

[11] 3,713,404
[45] Jan. 30, 1973

[54] PLANT HUSBANDRY

[75] Inventors: Harry F. Lavo, Stamford, Conn.; Charles J. Cante, Bayside, N.Y.

[73] Assignee: General Foods Corporation, White Plains, N.Y.

[22] Filed: April 16, 1971

[21] Appl. No.: 134,865

[52] U.S. Cl. ..................... 111/1, 47/2, 47/9, 252/307, 71/DIG. 1, 71/64 C
[51] Int. Cl. ......................................................A01c
[58] Field of Search.......... 47/2, 9.58, DIG. 9; 111/1, 111/6; 252/307; 239/8; 71/DIG. 1, 64 C

[56] References Cited

UNITED STATES PATENTS

| | | | |
|---|---|---|---|
| 1,995,853 | 3/1935 | Hunsaker | 47/2 UX |
| 2,630,183 | 3/1953 | Foutz | 47/2 UX |
| 2,875,555 | 3/1959 | Thiegs et al. | 47/2 |
| 2,916,855 | 12/1959 | Thiegs | 47/9 X |
| 3,157,964 | 11/1964 | Ferguson et al. | 47/2 X |
| 3,630,758 | 12/1971 | Despain | 47/2 X |
| 3,661,812 | 5/1972 | Buchner et al. | 47/9 X |

FOREIGN PATENTS OR APPLICATIONS 1,343,527    10/1963    France

OTHER PUBLICATIONS

Foam That Kills Weeds, Ball, Farm Journal, Nov. 1968, page 26.

*Primary Examiner*—Robert E. Bagwill
*Attorney*—Howard J. Newby, Bruno P. Struzzi and Daniel J. Donovan

[57] ABSTRACT

A high-expansion foam is employed as a vehicle for applying seeds, fertilizers, and other biological and chemical agents to plant life and soil. The long lasting foam is mechanically generated with a portable hand-held water powered generator from a foam-providing concentrate within which is incorporated the plant and/or soil agent. The foam-providing concentrate and the method of applying the foam are especially adaptable for employment with a residential-type garden hose utilizing typical residential water supply and pressure systems.

13 Claims, No Drawings

PLANT HUSBANDRY

BACKGROUND OF THE INVENTION

1. Field of the Invention

This invention relates, in general, to plant husbandry and, in particular, is directed to an improved method for the propagation, cultivation, and maintenance of lawns, trees, shrubs, and other plant forms. More specifically, the invention is concerned with a new and improved method of applying seeds, fertilizers, and other chemical and biological agents to plant life and soil for the promotion of healthful growth and the enhancement of plant appearance.

2. Description of the Prior Art

The lawns, shrubs, trees, and plants surrounding the average residence represent a considerable initial investment and, for proper maintenance, require the expenditure of substantial funds and time for the application of chemical agents to maintain them in healthy and attractive conditions. Lawns, for example, in addition to the need for cutting at regular intervals, require frequent fertilization and the application of chemicals to prevent, or at least control, unwanted infestation.

The typical homeowner, prior to the present invention, has been constrained to two general methods of depositing chemical agents on his lawn, neither of which methods are entirely satisfactory from the viewpoints of efficiency and economy. The proper application of dry chemicals by means of a "strip-type" mechanical spreader is time consuming since it must be accomplished with extreme care in order to avoid non-uniform deposition of the fertilizer, herbicide or other plant agent. As is well-known, non-uniformed applications of these chemicals leads to unsightly "burned-out" lawn areas from over application and to "gapping" of lawn areas from under-application.

Rotary spreaders employed for the use of applying dry chemicals to lawns, while being faster and perhaps easier to use than the strip-type spreaders, have significant drawbacks in that the pattern of application is ill-designed for confined areas and the broadcasting of the finely divided dry material by this method is subject to wind drift.

Conventional wet-spraying systems represent the other general method available to the average homeowner for applying chemical and biological agents to plant life and lawns to induce healthy growth. Although the liquid spraying systems afford faster application of the essential chemicals, relative to the dry chemical spreaders, they are equally difficult to control and are especially susceptible to loss of chemical and/or misapplication by wind deflection. Such misapplication can cause the loss of valued plants when they are inadvertently sprayed with weed killer chemicals. Wind drift of certain chemicals also creates a hazard to the personnel in the area at the time of application.

Common to both general methods, are the difficulties of close tolerances of the chemicals with regard to proper dosage and the inability or difficulty to accurately gauge the degree and uniformity of application of the chemical. Additionally, dry chemicals often require "watering-in," particularly when applied to lawns, and wet chemical sprays are subject to wasteful "run-off" from the foliage applied thereto.

Although the home or apartment owner has heretofore long been limited to relatively inefficient and tedious methods of maintaining lawns, trees, and shrubs, commercial firms and nursery proprietors have sought improved methods, with limited degrees of success, in attempts to increase their profit margins.

Techniques for applying chemicals and other plant agents involving spraying a fluid stream of a fiber-forming material in which herbicides and/or other plant agents are incorporated are disclosed in U.S. Pat. No. 2,749,964. Upon application the fluid stream of fiber-forming material forms a substantially continuous fabric-type covering on the coated surface which adheres the active chemical or chemicals to the soil or plant surface.

In somewhat similar fashion, Gaeth, et al. in U.S. Pat. No. 2,945,322 discloses the use of a aminoplast resin which, when applied in conjunction with a fertilizer, insecticide, etc. to plant life and/or the soil, hardens to form a semi-porous coating which prevents, or at least substantially reduces, the evaporation of water from the soil and protects the soil from erosion.

Foam fire-fighting techniques and related nozzle apparatus have been suggested as possible methods for applying chemicals to plant life (cf Foutz, U.S. Pat. No. 2,630,183) and, more recently, the use of low expansion (air-emulsions or froths) foams as vehicles for herbicides for industrial application has been discussed in the literature. ("Weeds, Trees And Turf," December, 1970 and January, 1971; Harvest Publishing Co., Cleveland, Ohio 44102.)

Although the above described innovations, particularly directed to the application of chemicals to large areas such as crop acreage, have been suggested and known for a period of well over 10 years, within the present knowledge of applicants, none of these techniques has proven to be adaptable to the typical homeowner's requirements associated with relatively smaller growing areas, low water pressures, and low cost.

Accordingly, there has existed a need for a more efficient, effective, and safe method of applying chemicals and plant agents to induce proper cultivation and maintenance of those lawns, trees, flowers, and shrubs which surround and beautify the many existing homes and apartments.

The formulations and method of application of the fertilizers and other chemical agents embodied in this invention have, to a large extent fulfilled the increasing requirements for a more effective way of promoting healthful plant growth and, most importantly, have substantially eliminated the potential physiological dangers associated with the conventional techniques of applying fertilizers, herbicides, fungicides, insecticides and the like which, although effective plant agents, can be most harmful to humans and pets when not properly controlled during application.

OBJECTS OF THE INVENTION

It therefore becomes an object of the present invention to provide a method of applying seeds, fertilizers and other chemical and biological agents to plant life which is, in many instances, less hazardous with respect to the person making the application and others in the vicinity than some of the methods heretofore available to the typical homeowner.

It is another object of the invention to provide a method of applying plant agents which is rapid, effective, and readily controllable with respect to area of application and dosage.

It is yet another object of the invention to provide a method of applying fertilizers and other plant agents which inherently yields a visual indication to assure complete coverage of the desired area to be treated and, significantly, also provides a visual index of dosage of the active ingredients over the desired area.

It is still another object of the invention to provide a method for applying chemical and biological agents to plants and soil wherein the vehicle for the plant or soil agent self-compensates for minor non-uniformity of application by evenly dispersing itself to form a substantially uniform layer or barrier on the applied surface.

It is still another object of the invention to provide a method for applying chemical and biological agents to plants and soil which assures excellent contact and adhesion of the agents to the plant surfaces or to the soil in which the plants are grown and a method of application which is substantially not affected by the wind.

It is a feature of the invention to provide a method of applying plant growth and maintenance agents which is readily adaptable to facilities and utility services available to the homeowner, and is also adaptable to industrial demands without high cost auxiliary apparatus.

SUMMARY OF THE INVENTION

Briefly, the above mentioned objects, features, and advantages of the present invention are attained through the employment of a high expansion foam as a carrier for the plant agent or agents; said high expansion foam being generated from a formulated aqueous foam-providing composition by means of a water powered portable foam generation nozzle which is operable with a water pressure and a water supply typically available to the average homeowner.

Surprisingly, it has been discovered that a high expansion foam can be generated by inducting a foam concentrate into a stream of water from a garden hose which, collaterally with conveying and applying the plant chemical agent to the desired plant surface, provides an excellent visual indication of where it is applied and, by the height of the applied foam, an excellent index of the uniformity of proper dosage. The high expansion foam substantially prevents loss and misapplication of the active chemicals due to inadvertence or windage, and is designed to remain in a stable, three-dimensional form for a period of time sufficiently long to assure complete coverage of the area intended to be treated.

The invention comprehends various foam producing aqueous concentrates each of which are formulated to provide the desired degree of foam expansion and the proper longevity of the foam after application when employed as a carrier for specific plant agents or combinations of agents. The salient point of the invention is the discovery that a high expansion foam can be employed as a vehicle for plant agents for rapid, effective and safe applications to plant life and associated soil. An important aspect of the invention resides in the attainment of foam concentrate formulations which yield, with facilities available to the average homeowner, high expansion, non-toxic, and non-irritating biodegradable foams which are chemical inert with respect to the chemical and biological agents contained therein, and which are tailored to provide uniform concentrations of active agent plus proper longevity of foam structure when applied under the stated conditions of use.

The invention is deemed further surprising and unobvious in that the high expansion foams can be uniformly generated in deference to varying conditions of supply water temperature and chemical content and varying air temperature, within a reasonable degree, without significantly affecting the foam structure. Essential to the method concept of employing a high expansion foam as a medium for depositing horticultural enhancing agents, the essence of the invention is predicated on the discovery that the additaments to the formulations for effecting the proper pH range conducive to encouraging plant growth are collaterally effective for inducing the proper degree of foam expansion during application and also for inhibiting any potential chemical reactions of the foaming constituent with the horticultural enhancement agents in the foam-providing concentrate mixture during storage and after application.

The features of the invention which are believed to be novel are set forth with particularity and distinctly claimed in the concluding portion of the specification. The invention, however, both as to its organization and operation, may best be appreciated by reference to the following detailed description of the preferred embodiments.

DESCRIPTION OF THE PREFERRED EMBODIMENTS

The present invention comprehends the use of a high expansion foam as the vehicle for applying a wide range of agents to plant life and/or the soil in which the plants are grown. Those agents which can be applied by the method of the invention, in addition to seeds, include, but are not limited to, organic and inorganic fertilizers, herbicides, fungicides, insecticides, pesticides, and sterilants.

Briefly, the formulations of the invention are suitably concentrated aqueous solutions or mixtures of the foam generating constituents and the material or materials intended for culture and maintenance of the grass and/or other botanical plants. In those instances, however, where the plant chemical is oil soluble, the inventive formulation comprehends an emulsifiable concentrate. In either aqueous or emulsifiable form, the solution or mixture is concentrated to provide a sufficient amount of agent to meet the requirements of the average homeowner and is packaged in convenient form for handleability, dilution with water, and high expansion foam generation when connected to a garden hose-type foam generator operating from a water supply having a static pressure ranging above at least about 15 lbs. per square inch.

The term "high expansion foam" as used herein is intended to define a foam which expands the volume of the liquid stream of the foam-providing solution at least 80-fold and preferably 150- to 180-fold. The foam-providing solution is that solution which results from the dilution of the concentrate of foam agent and plant chemical as the concentrate is educted into and mixed with the stream of water passing through a hand-held foam generator connected to a residential supply of water by means of a garden hose. The water powered foam generator intended for use with the concentrate, will dilute the concentrate with approximately 15 – 90 parts by volume of water to one part of concentrate and preferably will be adjusted to develop dilution ratios of 35 – 75 volumes. In other words, the volume of the concentrate is expanded in the form of a foam in the range of 1500 to about 16,000 fold. Thus a gallon of concentrate (0.134 cubic feet) when properly employed, develops 200 to 2100 cubic feet of foam which, for example, when applied to a lawn would cover an area of approximately 600 to 6300 square feet with a coherent foam blanket 4 inches in height.

These dilution ratios and foam volumes are intended to be exemplary and representative of the best contemplated mode of operation of the invention as applied to the treatment of residential lawns. Understandably, concentrates having chemical agents intended for trees and shrubbery are formulated with different foam agents and employed at somewhat different dilution ratios in order to effect foams having a longer lasting capability than foams intended for lawn application.

For lawn application the expansion ratio of the finally discharged stream spumed as a high expansion foam is formulated to provide adequate, highly visual, coverage of the lawn with a blanket of foam of approximately 2 – 6 inches in height and with a "flowability" characteristic which permits the foam to seek a substantially uniform level. Additionally, the foam will not completely collapse or "break" until the designated lawn area has received the intended application of proper dosage. Those foam-providing concentrates of the invention intended and designed for lawn application are formulated to provide a foam which has a stability for approximately 10 – 30 minutes — that time which it is estimated will be typically required to deplete a gallon supply of foam concentrate.

The foam-providing concentrates of the invention intended for the application of foam mixtures to trees and shrubs are designed to spume foams of a more highly stable nature than those foams intended for lawn application. For the application of foams to trees, flowers, and shrubs, the criticality of foam characteristic is that of being of a consistency to prevent, or at least minimize, "run-off" and, upon complete collapse, to yield a tightly adhering film on the foliage, the purpose of which is to assist in adhering the active chemical to the exposed surface of the plant and to minimize wash-off of the chemical by rain.

In both types of application, and to the degree immediately hereinbefore described, the foams of the present invention are stabilized frothy substances generated by mechanical agitation concomitant with the introduction of air into a dilution of a foam-providing concentrate which yields a long-lasting foam which acts as a vehicle for the uniform application of a plant chemical and collaterally provides a visual index of uniform coverage of the surface to which it is applied.

One preferred embodiment of the invention is a foam-providing concentrate containing dissolved therein the particular plant agent and packaged in a container (preferably plastic) which is adapted for attachment to a small, hand-held, water powered foam generator connected to a home water supply by means of a garden hose. The water powered foam generator is of the type which, by means of a venturi arrangement, educts the foam providing concentrate mixture into a stream of water and, after suitable dilution and mechanical agitation, the foam-providing solution is directed against a foraminous barrier (reaction nozzle) through which a current of air is being simultaneously and unidirectionally forced. The preferred type of foam generator is of the design wherein the ratios of volumes of water, foam-providing concentrate, and air are substantially constant over a wide range of water rates through the generator. Thus, within reasonable limits, increasing the water rate does not materially affect the quality or physical characteristics of the spumed foam but rather, affords faster application of the foam to the designated surface.

It is also within the scope of the invention to suitably dilute the foam concentrate mixture with water and discharge the diluted solution as a foam from a pressurized garden-type portable sprayer having a foam generating-type nozzle.

Therefore, insofar as the type of applicator system, the plant chemical agent-containing foam-providing concentrates are formulated for, and primarily intended to be used, with a small hand-held mechanical type foam generator operating within a pressure range from at least about 15 to about 70 lbs. per sq. in. and greater. In its broadest aspects, however, the foam-providing concentrates, with suitable modification, can also be employed for use with industrial-type foaming equipment.

The foam-providing concentrates of the invention are comprised of at least one constituent, a foaming agent, that is spumable in aqueous dispersion and adapted in such form to provide the continuous phase which constitutes the walls of the cells or bubbles in the high expansion foam material derived therefrom. In addition to being adaptable to being spumed by pneumatic or mechanical means into a three-dimensional foam structure, the foaming agent in aqueous dispersion is chemically unreactive with the plant chemical and/or biological agent, or agents, which are dissolved or blended in the foam-providing concentrates. Foaming agents which satisfy these critical aspects of the invention include the following: sodium lauryl sulfate, potassium lauryl sulfate, ammonium lauryl sulfate, triethanolamine lauryl sulfate, diethanolamine lauryl sulfate, lauric acid diethanolamine, diethanolamine-coconut fatty acid condensate, coconut fatty acid ester of sodium isethionate, sodium salt of lauryl ether sulfate, potassium salt of lauryl ether sulfate, ammonium salt of lauryl ether sulfate, diethanolamine salt of lauryl ether sulfate, triethanolamine salt of lauryl ether sulfate; and the potassium, sodium, ammonium and triethanolamine salts of lauryl sulfonate and lauryl alcohol ether sulfonate.

Since the intended use of the spumed high expansion foam product is that of a vehicle for applying agents to plants and associated soils, it is essential that the pH of the applied foam be at a level which is compatible to plant life, and preferably be at that level which furthers healthy growth of the plant on which it is deposited. This criterion, in general, requires the foam to have a pH value of above 6.0 and preferably to be in the range of 6.5 to 9.0. Those versed in the art of horticulture, however, will readily recognize that foams having a slightly lower pH value can be used on "acid-loving" plants such as azaleas and foams having a higher pH level are compatible with other types of plant life.

Another criterion of the foam-providing concentrate of the invention is that of being spumable in an aqueous dispersion to a foam having a controllable degree of high expansion when mechanically generated with a flow of tap water from a supply source with a relatively low pressure of 15 lbs. per sq. in. as well as with much higher pressures — typically up to 70 lbs. per sq. in. With respect to obtaining and controlling the degree of expansion of the generated foam under these limiting conditions, it has been found that certain "foam booster" chemical agents are effective. To obtain enchanced formability, such agents as blended alkyl sulfates, alkyl sulfonates, alkylol ether sulfates, lauric acid monoethanolamide, stearic acid monoethanolamide, lauric acid isopropanolamid and mixtures of lauric acid and myristic acid monoethanolamide are incorporated into the foam-providing concentrate mixture.

In addition to the above, it is essential to the success of the invention that the spumable foam have a degree of stability which precludes the foam from rapidly "-breaking," but assures a coherent layer which will remain tenaciously adhered to the applied surface as a visible covering in the form of a three-dimensional foam structure for a period ranging from 10 - 30 minutes after application. The stability of the foam products of the invention can be controlled to the proper degree by the addition of a small amount of certain compounds which are generally classed as humectants. Particularly, polyhydric alcohols such as glycerol, propylene glycol, ethylene glycol, lauryl alcohol, myristyl alcohol, stearyl alcohol or mixtures thereof have been found to be effective.

As stated hereinabove, one of the important advantages of the invention is ease of manipulation during application of the plant agent-foam combination. In this respect, the foam-providing mixture is highly concentrated in order to minimize weight and bulk and thereby be readily portable by the user. In view of its concentrated form and the fact it is intended to be educted into a stream of water for purposes of dilution and mechanical agitation, it is essential that the fluidity of the concentrate be maintained during storage and during application within a narrow designated range of limits in order to insure proper dilution when employed as described above. Low molecular weight alcohols such as isopropyl alcohol, methanol, and ethanol when employed as additives to the foam-providing concentrate in small amounts have been determined to adequately control the fluidity of the concentrate at the anticipated usage temperature range of 50° – 120°F. and, most importantly, when formulated according to the procedures described in the illustrative examples hereinbelow, do not adversely effect the stability of the foam product when it is applied to the lawn or other plant life.

Summarizing, it is seen that the foam-providing concentrates of the invention provide for a foaming agent to produce a high expansion foam, an agent to assist the production of foam of the proper degree of expansion with limited mechanical agitation such as that provided by a home-type water powered generator, an additament to assure proper stability of the foam blanket product and yet permit the foam blanket to have a degree of flowability, and another additive to insure a proper degree of fluidity of the concentrate. Importantly, these materials are chemically unreactive with the incorporated plant agent or agents and, in addition, effect a pH range of the resultant applied foam blanket which is conducive to healthy plant growth.

It is the combination of these requirements or criteria which have either eluded the prior art or which have presented an insurmountable problem which the prior art has failed to satisfactorily resolve, that form the distinctive and salient features of the present invention which has led to its successful practice.

Understandably, the invention encompasses combinations of different additives and differently selected ratios or quantities of additives for the purpose of tailoring foam-providing concentrates to yield foam products having specific desired characteristics for use on particular types of plants, plant foliages and soils.

As stated above, the product concept of the invention includes a foam-providing concentrate within which is incorporated a plant agent or combination of agents selected from the general classes of seeds, organic fertilizers, inorganic fertilizers, herbicides, insecticides, fungicides, and sterilants. In almost all instances, with the exception of plant seeds, the plant agent is either soluble in the aqueous concentrate or forms a relatively stable colloidal suspension. In those instances wherein the plant agent is oil soluble, micellar solubilization of the oil soluble plant agent is achieved provided the oil is present in amounts less than about 10 percent by volume of the concentrate. In those instances where the oil content is greater than about 10 percent, an augmenting emulsifier is employed, when necessary, to provide a stable foam-providing emulsion concentrate of the plant agent. Representative auxiliary emulsifiers for this purpose are sodium stearate, sodium laurate, and lauryl benzene sulfonate.

Plant agents which have been determined suitable for the purpose of this invention are categorized and tabulated below. The tabulation is illustrative and is not intended to be all inclusive.

TABLE 1

Plant Agents Incorporated In Foam-Providing Concentrate

| Plant Agent | Chemical |
|---|---|
| Organic Fertilizer | Urea<br>Urea Formaldehyde |
| Inorganic Fertilizer | Potassium Chloride<br>Potassium Nitrate<br>Ammonium Nitrate<br>Potassium Tripolyphosphate<br>Potassium Monophosphate<br>Ferrous Sulfate |
| Herbicide | 2-(2,4,5-trichlorophenoxy)propionic acid-<br>2-ethylhexyl ester<br>2-(2,4,5-trichlorophenoxy)propionic acid<br>2,4-dichlorophenoxy acetic acid<br>2,6-di-tert-butyl-p-tolyl-methylcarbamate<br>2-(methyl-4-chlorophenoxy)propionic acid<br>2,4-dichlorophenoxy acetic acid amine<br>2,4-dichlorophenoxy acetic acid butyl ester |

| | |
|---|---|
| Fungicide | 2,4-dichloro-6-o-chloranilino-s-triazine |
| | 2,6-dichloro-4-nitroaniline |
| | pentachloro-nitrobenzene |
| Insecticide | 1,2,4,5,6,7,8,8-octachloro-3,4,7,7a-tetra hydro-4,7-methenoindan |
| | 1-naphthyl-N-methylcarbamate |
| Sterilant | dimethylarsinic acid |
| | 5-bromo-3-sec-butyl-6-methyluracil |

Understandably, the choice of the plant chemical agent dissolved or suspended in the foam-providing concentrate can have a critical influence on the character and quality of the foam generated during application and after it has been applied to the subject. In general, and with the exception of seeds, it has been established that the molecular chain length and stereochemistry of the chemical plant agent is a determinative factor in the consideration of the selection of an agent which is compatible with the foam-providing ingredients to yield a foam of the desired physical characteristics. As a general rule, it has been determined, that the normal long chain chemical agents are more compatible, in most instances, with the foaming agents in that they have less tendency to perform as anti-foaming materials provided the width of the chemical agent molecule, when oriented at the foam air-water interface at low molecular areas of less than 60 Angstroms per molecule is not more than two methylene groups. While not intended to be bound by theory, it is hypothesized that the long straight chain chemical agents are better able to align themselves within the hydrophilic-hydrophobic wall structure of the foam products and, therefore, have less detrimental effect on the quality and stability of the foam.

In those instances wherein seeds or other relatively large insoluble particles, such as inert materials combined with active plant agents (commercially available fertilizers, herbicides, etc.) are to be foam-applied, it is contemplated that the seed or other insoluble particles will be thoroughly blended in the foam-providing concentrate immediately prior to application and will be kept in a suspended state in the concentrate during application by shaking or otherwise agitating the concentrate container attached to the foam generator and, in this manner, be uniformly distributed throughout the foam as it is applied to the soil.

The invention will now be described more specifically by reference to the following examples which are set forth to illustrate the various facets of the invention. It should be understood, however, that the examples are merely meant to be illustrative and the invention is not to be limited thereto.

Reference is to be had to McCutcheon's "Detergents and Emulsifiers" 1970 Annual Edition, Allured Publishing Corp., Ridgewood, New Jersey 07450 and to "Pesticide Handbook —Entoma," 1970 Edition, College Science Publishers, State College, Pa. 16801 for the trade names, suppliers, and chemical nomenclature identifying the foaming agents and plant agents respectively used in this specification, including the illustrative examples set forth below.

Alternatively the seeds or other relatively large insoluble particles can, with suitable equipment, be aspirated directly into the stream of foam as it is discharged from the nozzle of the hand-held generator.

EXAMPLE I

FOAM-PROVIDING CONCENTRATE WITH ORGANIC-INORGANIC FERTILIZER

FORMULATION

| | |
|---|---|
| Sodium lauryl sulfate[1] | 0.84 lbs. |
| Blended alkyl sulfates[2] | 0.84 |
| Glycerol | 3.36 |
| Isopropyl alcohol | 2.23 |
| Potassium tripolyphosphate | 0.88 |
| Ferrous sulfate | 0.093 |
| Water | 1.92 |
| Urea-formaldehyde[3] | 5.77 |
| Total | 15.933 lbs. |

(1) STEPANOL T–28 (35.5% active sodium lauryl sulfate) manufactured by Stepan Chemical Co., Northfield, Ill.
(2) STEPANOL 317 (92.5% active blend of linear alkyl sulfonates and linear alcohol ether sulfonates (derived from such alcohols as lauryl, myristyl, cetyl alcohols, etc. and neutralized with an alkanolamine) and alkylolamide manufactured by Stepan Chemical Co., Northfield, Ill.
(3) NITROFORM brand of urea-formaldehyde manufactured by Hercules, Inc., Wilmington, Del.

The sodium lauryl sulfate (foaming agent), blended alkyl sulfonates (foam booster), glycerol (foam stabilizer) and isopropyl alcohol (fluidity agent) were combined and blended for about 2 minutes with substantially no aeration.

The urea formaldehyde (organic fertilizer) was then gently blended into the above mixture until completely dispersed throughout.

An aqueous solution of the potassium tripolyphosphate and ferrous sulfate (inorganic fertilizers) was prepared and the solution was then combined with the organic fertilizer-containing foam-providing concentrate and blended for 1 minute under non-aerating conditions.

The complete mixture had the following physical characteristics:

| | |
|---|---|
| pH (72°F.) | 8.5 |
| Density | 1.22 grams/cc. |
| Viscosity*(72°F.) | 600 – 700 centipoise |

*Measured with a Brookfield Viscometer (Model LVF) employing a NO. 3 spindle at 60 rpm.

The fertilizer-containing concentrate was then transferred to a 1.5 gallon container having a threaded neck and the container was attached to a water powered foam generator.

FOAM GENERATOR

The foam generator was of the design providing for the eduction of the concentrate into a stream of water passing through the generator at high velocity. The concentrate entered the stream of water through an annular port concentrically encircling the stream of water and was well mixed with the water before the mixture was impinged on a 10 mesh (U.S. Standard Sieve) screen at which point it was mechanically agitated with air drawn into the generator by the forward flow of the mixture. The water powered generator was designed to operate from a garden hose delivering water from residential supply at a static pressure ranging from 15 – 70 psig. The generator was equipped with a hand controlled water valve and a variable orifice in the eductor tube which could be positioned to provide a dilution of the concentrate ranging from about 1.5 parts by volume of concentrate: 98.5 parts by volume of water to about 6.0 parts of concentrate: 94 parts of water. The forward or foam delivery end of the generator was equipped with a 40° diverging hollow cone nozzle for directing the trajectory of the foam.

FOAM GENERATION

The above foam-providing concentrate mixture of organic-inorganic fertilizer was foamed onto a simulated lawn surface under the following conditions of operations:

| | |
|---|---|
| Air Temperature | 67°F. |
| Water Temperature | 68°F. |
| Water Pressure | 30 psig. |
| Water Rate | 2.65 gal./min. |
| Foam-providing Concentrate Rate | 0.0758 gal./min. |
| Air Rate | 64.0 ft.$^3$/min. |

The generator was run for one minute under these conditions of operation and during this time interval spumed 66.7 ft$^3$ of foam as a layer having a substantially uniform height of 5 inches over an area of 160 ft$^2$. The expansion ratio of the concentrate was calculated to be 6560:1.

The foam when applied to the horizontal surface had a tendency to level itself and did not collapse to any appreciable degree within 20 – 30 minutes. It was estimated the foam, if left undisturbed, would have substantially completely collapsed 50 minutes after application.

A portion of the concentrate was diluted with water to the same extent as occurred in the water-powered generator and was found to have a pH of 9.4 and a surface tension of 25.31 dynes per centimeter. (Rosano Surface Tensiometer. Federal Pacific Elec. Co., Newark, N.J.)

EXAMPLE II

FOAM-PROVIDING CONCENTRATE WITH INSECTICIDE COMBINATION

FORMULATION

| | |
|---|---|
| Ammonium salt of a sulfated nonylphenoxypoly (ethyleneoxy) ethanol[1] | 0.154 gal. |
| Coconut fatty acid diethanolamine[2] | 0.154 gal. |
| Glycerol | 0.205 gal. |
| Isopropyl alcohol | 0.256 gal. |
| Water | 0.231 gal. |
| Total | 1.000 gal. |
| 1-naphthyl N-methyl-carbamate[3] | 177.6 grams. |
| 1,2,4,5,6,7,8,8,-Octachloro-3a, 4,7,7a-[4] tetrahydro-4,7 methanoindan | 124.9 ml. |

(1) ALIPAL CO–436 (58% active liquid) manufactured by GAF Corp., N.Y., N.Y.
(2) MONAMINE ADD–100 (100% active liquid) manufactured by Mona Industries, Inc., Paterson, N.J.
(3) SEVIN (100% active powder) manufactured by Union Carbide Corp., N.Y., N.Y.
(4) Chlordane (70% active in petroleum ether distillate) manufactured by Ortho Div., Chevron Chemical Co., San Francisco, Calif.

The foam-providing concentrate agents were combined and mixed for 2 minutes under non-aerating mixing conditions. The insecticide agents were then added to the concentrate and thoroughly blended to provide a mixture having a pH of 8.7; a density of 1.077 grams/ml.; and a viscosity of 266 centipoise (all measurements taken at 75°F.).

The above insecticide-containing foam-providing concentrate can be spumed to a high-expansion foam using the procedure and foam generator as described in Example I. The foam has a half-life of approximately 20 minutes when applied to a flat surface at a uniform height of 4 inches. The volumetric expansion ratio of the concentrate is approximately 3200:1 employing water at 65°F. at a pressure of 35 psig. to dilute the concentrate 20-fold and to generate foam at an air temperature of 60°F. The diluted foam solution has a pH of 8.9; a surface tension of 29.84 dynes per cm; and a viscosity of 4.8 centipoise. All measurements taken at 75°F. with instruments as described in Example I except spindle No. 1 was employed with the viscometer.

EXAMPLE III

FOAM-PROVIDING CONCENTRATE WITH HERBICIDE

(BROAD LEAF WEED KILLER)

FORMULATION

| | |
|---|---|
| Sodium lauryl sulfate[1] | 0.165 gal. |
| Blended alkyl sulfonates[1] | 0.165 |
| Glycerol | 0.22 |
| Isopropyl alcohol | 0.22 |
| Water | 0.213 |
| Total | 0.983 gal. |
| Dimethylamine salt of 2,4 dichlorophenoxy acetic acid[2] | 51 ml. |
| 2-ethyl hexyl ester of 2-(2,4,5-trichloro phenoxy) propionic acid[3] | 38.6 ml. |

(1) Same as Example I
(2) WEED-RHAP A–4D (49.5% active) manufactured by Hercules Inc., Wilmington, Del.
(3) Silvex (65.2% active) manufactured by Dow Chemical Co., Midland, Mich.

The herbicide-containing foam-providing concentrate was prepared as in Example II. Measured at 75°F. the mixture had a density of 1.086 grams/ml.; a pH of 8.14 and a viscosity of 245 centipoise.

The above herbicide-containing foam-providing concentrate can be spumed to a high-expansion foam using the procedure and foam generator as described in Example I. The foam has a half-life in excess of 15 minutes when applied as a uniform layer 4 inches high on a flat surface. The volumetric expansion of the concentrate when spumed to a foam employing 95 parts of water at 67°F. to 5 parts of concentrate is approximately 4700 fold.

The diluted foam solution, at 75°F. has a density of 0.993 grams/ml.; a pH of 7.98; a viscosity of 2.8 centipoise; and a surface tension of 29.6 dynes per centimeter.

EXAMPLE IV

FOAM-PROVIDING CONCENTRATE WITH HERBICIDE

(PREEMERGENCE CRABGRASS HERBICIDE)

FORMULATION

| | |
|---|---|
| Triethanolamine lauryl sulfate[1] | 0.334 gal. |
| Lauryl dimethylamine oxide[2] | 0.134 |
| Glycerol | 0.20 |
| Isopropyl alcohol | 0.10 |
| Water | 0.213 |
| Total | 0.981 gal. |
| 2,6-di-tert-butyl-p-tolyl-[3] Methylcarbamate | 112 grams. |

(1) MAPROFIX TLS–500, manufactured by Onyx Chemical Co., Jersey City, N.J.
(2) AMMONYX LO, manufactured by Onyx Chemical Co., Jersey City, N.J.
(3) AZAK (80% active wettable powder) manufactured by Hercules, Inc., Wilmington, Del.

The concentrate with herbicide was prepared by combining all ingredients and mixing for 1 minute. At 75°F. the prepared formulation had a density of 1.06 grams/ml.; a pH of 7.75; and a viscosity of 235 centipoise.

The above herbicide-containing concentrate can be spumed to a high-expansion foam as in Example III and will produce, on a volumetric basis, about 5550 parts of foam to one part of concentrate.

The foam solution (the concentrate diluted with water 20 fold as in foaming) has a viscosity of 4 centipoise; a surface tension of 24.2 dynes per centimeter; a pH of 7.8 and a density of 0.987 grams per ml.

EXAMPLE V

FOAM-PROVIDING CONCENTRATE WITH FUNGICIDE-FERTILIZER COMBINATION

FORMULATION

| | |
|---|---|
| Sodium lauryl suflate[1] | 0.103 gal. |
| Blended alkyl sulfonates[1] | 0.103 |
| Glycerol | 0.308 |
| Isopropyl alcohol | 0.257 |
| Dipotassium phosphate ($K_2HPO_4$) | 110 grams. |
| Ferrous sulfate | 13.1 |
| Water | 0.231 gal. |
| Urea-formaldehyde[1] | 1460 grams. |
| 2,4-dichloro-6-(o-choranilino) s-triazine[2] | 32.2 grams. |

(1) Same as in Example I.
(2) DYRENE (50% active wettable powder) manufactured by Chemagro Corp., Kansas City, Mo.

The above formulated concentrate can be diluted with water and spumed as a foam as described in Example I and, at a volumetric dilution of 28 parts water to 1 part concentrate will produce 5680 parts of foam for one part concentrate (volume basis).

The concentrate has a pH of 8.5; a density of 1.22 grams per ml.; and a viscosity of 650 centipoise. (All measured at 75°F.)

The diluted concentrate (28 parts water to 1 part concentrate) has a pH of 9.39; a density of 0.996 grams per ml.; a viscosity of 4.5 centipoise and a surface tension of 25.3 dynes/cm (all measured at 75°F.).

What is claimed and desired to be secured by Letters Patent is:

1. A method of treating plant life and soil comprising incorporating a plant agent in an aqueous, spumescent foam concentrate and applying said agent and concentrate as a foam onto plant life and/or soil, wherein said aqueous, spumescent foam-providing concentrate comprises a mixture of;

a. a foaming agent selected from the group consisting of water soluble salts of lauryl sulfate, water soluble salts of laurel ether sulfate, water soluble salts of lauryl sulfonates, fatty acid esters of sodium isetheonate, and mixtures thereof, b. a foam enhancer selected from the group consisting of blended alkyl sulfonates, alkylol ether sulfonates, lauric acid monoethanolamide, stearic acid monoethanolamide, lauric acid isopropinolamide, mixtures of lauric acid and myristic acid monoethanolamide, and mixtures thereof, c. a foam stabilizer selected from the group consisting of glycerol, propylene glycol, ethylene glycol, lauryl alcohol, myristyl alcohol, stearyl alcohol and mixtures thereof, d. a foam-providing concentrate fluidity modifier selected from the group consisting of isopropyl alcohol, methanol, ethanol and mixtures thereof, and e. a plant agent selected from the group consisting of organic fertilizer, inorganic fertilizer, herbicide, insecticide, sterilant, seed, and mixtures thereof.

2. The method according to claim 1 wherein the agent-containing foam is mechanically generated from an aqueous, spumescent, agent-containing foam-providing concentrate, said foam generated by means of a portable water powered foam generator.

3. The method according to claim 2 wherein said aqueous, spumescent, foam-providing concentrate has a pH of at least about 6.

4. The method according to claim 2 wherein said plant chemical agent-containing foam-providing concentrate is an emulsifiable mixture.

5. The method of claim 1 wherein said plant agent is an organic fertilizer selected from the group consisting of urea, urea formaldehyde, and mixtures thereof.

6. The method of claim 1 wherein said plant agent is an inorganic fertilizer selected from the group consisting of potassium chloride, potassium nitrate, ammonium nitrate, potassium tripolyphosphate, potassium monophosphate, ferrous sulfate and mixtures thereof.

7. The method of claim 1 wherein said plant agent is a herbicide selected from the group consisting of 2-(2,4,5-trichlorophenoxy) propionic acid, 2-(2,4,5-trichlorophenoxy) propionic acid, 2-ethylhexyl ester, 2,4-dichlorophenoxy acetic acid, 2,6-di-tert-butyl-p-tolyl-methylcarbamate, 2-(methyl-4-chlorophenoxy) propionic acid, 2,4-dichlorophenoxy acetic acid amine, 2,4-dichlorophenoxy acetic acid butyl ester and mixtures thereof.

8. The method of claim 1 wherein said plant agent is a fungicide selected from the group consisting of 2,4-dichloro-6-o-chloroanilino-s-triazine, 2,6 dichloro-4-nitroaniline and mixtures thereof.

9. The method of claim 1 wherein said plant agent is an insecticide selected from the group consisting of 1,2,4,5,6,7,8,8-octachloro-3a,4,7,7a-tetrahydro-4,7-methanoindan, 1-naphthyl-N-methylcarbamate and mixtures thereof.

10. The method of claim 1 wherein said plant agent is a sterilant selected from the group consisting of dimethylarsinic acid, 5-bromo-3-sec-butyl-6-methyluracil and mixtures thereof.

11. The method of claim 1 wherein said plant agent is grass seed.

12. A method of treating plant life and soil comprising incorporating a plant agent in an aqueous, spumescent foam concentrate and applying said agent and concentrate as a foam onto plant life and/or soil, wherein said aqueous, spumescent foam-providing concentrate comprises a mixture of;

a. a foaming agent selected from the group consisting of water soluble salts of lauryl sulfate, water soluble salts of laurel ether sulfate, water soluble salts of lauryl sulfonates, fatty acid esters of sodium isetheonate, and mixtures thereof, b. a foam enhancer selected from the group consisting of blended alkyl sulfonates, alkylol ether sulfonates, lauric acid monoethanolamide, stearic acid monoethanolamide, lauric acid isopropinolamide, mixtures of lauric acid and myristic acid monoethanolamide, and mixtures thereof, c. a foam-providing concentrate fluidity modifier selected from the group consisting of isopropyl alcohol, methanol, ethanol and mixtures thereof, and d. a plant agent selected from the group consisting of organic fertilizer, inorganic fertilizer, herbicide, insecticide, sterilant, seed, and mixtures thereof.

13. An aqueous, spumescent, foam-providing concentrate comprising;

a. a water soluble salt of lauryl sulfate in an amount ranging from about 1.5 parts to about 15 parts by weight of the concentrate, b. a water soluble amine salt of blended alkyl sulfonates, alkylol ether sulfonates, and alkylolamides in an amount ranging from about 3.5 parts to about 14.5 parts by weight of the concentrate, c. glycerol, in an amount ranging from 0 to about 22.5 parts of glycerol by weight of the concentrate, d. isopropyl alcohol in an amount ranging from about 5.5 parts to about 20.0 parts by weight of the concentrate, e. water in an amount ranging from about 5.5 parts to about 22.0 parts by weight of the concentrate, and f. plant agent selected from the group consisting of organic fertilizer, inorganic fertilizer, herbicide, insecticide, sterilant, seed, and mixtures thereof in an amount ranging from about 1 part to about 100 parts by weight of the concentrate.

* * * * *